US006785377B1

(12) United States Patent
Boldt et al.

(10) Patent No.: US 6,785,377 B1
(45) Date of Patent: Aug. 31, 2004

(54) DATA CALLS USING BOTH CONSTANT BIT RATE AND VARIABLE BIT RATE CONNECTIONS

(75) Inventors: Dean Boldt, Parkville, MO (US); Jason Torrey, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 09/487,147

(22) Filed: Jan. 19, 2000

(51) Int. Cl.[7] .............................................. H04M 7/00

(52) U.S. Cl. ............. 379/229; 370/395.05; 370/395.61; 370/395.64; 379/219; 379/220.01; 379/221.08; 379/230

(58) Field of Search ..................... 370/395.61, 395.64, 370/395.65, 395.5; 379/207.02, 229, 230, 219, 221, 220.01, 221.08

(56) References Cited

U.S. PATENT DOCUMENTS

| 4,720,850 A | 1/1988 | Oberlander |
| 4,763,317 A | 8/1988 | Lehman |
| 5,067,123 A | 11/1991 | Hyodo et al. |
| 5,101,404 A | 3/1992 | Kunimoto et al. |
| 5,115,427 A | 5/1992 | Johnson, Jr. et al. |
| 5,182,550 A | 1/1993 | Masuda et al. |
| 5,204,857 A | 4/1993 | Obara |
| 5,216,669 A | 6/1993 | Hofstetter et al. |
| 5,255,266 A | 10/1993 | Watanabe et al. |
| 5,258,979 A | 11/1993 | Oomuro et al. |
| 5,278,889 A | 1/1994 | Papanicolaou et al. |
| 5,289,536 A | 2/1994 | Hokari |
| 5,327,421 A | 7/1994 | Hiller et al. |
| 5,329,308 A | 7/1994 | Binns et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,365,524 A | 11/1994 | Hiller et al. |
| 5,384,771 A | 1/1995 | Isidoro et al. |
| 5,392,402 A | 2/1995 | Robrock, II |

(List continued on next page.)

OTHER PUBLICATIONS

Smith, Hugh M., et al., "Pattern Smoothing for Compressed Video Transmission," XP–002260732, Proceedings of IEEE International Conference on Communications, Jun. 1997.

Vickers, Brett J., et al., "An ATM Service Architecture for the Transport of Adaptively Encoded Live Video," Computer Communications, Elsevier Science Publishers BV Amsterdam, vol. 20, No. 12, 1997, XP004103074.

Helen A. Bauer, John J. Kulzer, Edward G. Sable, "Designing Service–Independent Capabilities for Intelligent Networks," IEEE, Dec. 1988, pp. 31–41.

ITU–T Q.1219, "Intelligent Network User's Guide For Capability Set 1," Apr., 1994.

Thorner, "Intelligent Networks, Capter 2," 1994, Artech House, pp. 11–107.

ITU–T, Recommendation Q.722, "Specifications of Signalling System No. 7, General Function of Telephone Messages and Signals," 1993.

*Primary Examiner*—Bing Bui (57) ABSTRACT

A first call processing system advantageously uses a constant bit rate connection and a variable bit rate connection to utilize the bandwidth for a data call. The first call processing system receives signaling for the data call. The first call processing system then processes the signaling to generate a first instruction to set up a constant bit rate connection for the data call between the first call processing system and a second call processing system. The first call processing system processes the signaling to generate a second instruction to set up a variable bit rate connection between the first call processing system and the second call processing system. Any bandwidth that the data call does not need and use can be utilized for other calls. Thus, the performance of other calls is improved.

36 Claims, 5 Drawing Sheets

U.S. PATENT DOCUMENTS

| | | | |
|---|---|---|---|
| 5,422,882 A | 6/1995 | Hiller et al. | |
| 5,426,636 A | 6/1995 | Hiller et al. | |
| 5,428,607 A | 6/1995 | Hiller et al. | |
| 5,434,852 A | 7/1995 | La Porta et al. | |
| 5,452,296 A | 9/1995 | Shimizu | |
| 5,452,297 A | 9/1995 | Hiller et al. | |
| 5,459,721 A | 10/1995 | Yoshida | |
| 5,461,669 A | 10/1995 | Vilain | |
| 5,463,620 A | 10/1995 | Sriram | |
| 5,469,501 A | 11/1995 | Otsuka | |
| 5,473,677 A | 12/1995 | D'Amato et al. | |
| 5,473,679 A | 12/1995 | La Porta et al. | |
| 5,483,527 A | 1/1996 | Doshi et al. | |
| 5,509,010 A | 4/1996 | LaPorta et al. | |
| 5,513,180 A | 4/1996 | Miyake et al. | |
| 5,526,359 A | 6/1996 | Read et al. | |
| 5,539,884 A | 7/1996 | Robrock, II | |
| 5,541,917 A | 7/1996 | Farris | |
| 5,544,152 A | 8/1996 | Obermanns et al. | |
| 5,563,939 A | 10/1996 | LaPorta et al. | |
| 5,566,173 A | 10/1996 | Steinbrecher | |
| 5,568,475 A | 10/1996 | Doshi et al. | |
| 5,583,849 A | 12/1996 | Ziemann et al. | |
| 5,600,643 A | 2/1997 | Robrock, II | |
| 5,623,491 A | 4/1997 | Skoog | |
| 5,629,930 A | 5/1997 | Beshai et al. | |
| 5,675,384 A | 10/1997 | Ramamurthy et al. | |
| 5,680,390 A | 10/1997 | Robrock, II | |
| 5,703,876 A | 12/1997 | Christie | |
| 5,751,706 A | 5/1998 | Land | |
| 5,751,712 A * | 5/1998 | Farwell et al. | 370/431 |
| 5,765,108 A | 6/1998 | Martin et al. | |
| 5,771,234 A | 6/1998 | Wu et al. | |
| 5,784,371 A | 7/1998 | Iwai | |
| 5,790,173 A * | 8/1998 | Strauss et al. | 725/114 |
| 5,825,780 A | 10/1998 | Christie | |
| 5,878,029 A | 3/1999 | Hasegawa et al. | |
| 5,889,773 A | 3/1999 | Stevenson, III | |
| 5,917,815 A | 6/1999 | Byers et al. | |
| 5,940,491 A | 8/1999 | Anderson et al. | |
| 5,953,338 A | 9/1999 | Ma | |
| 5,982,783 A | 11/1999 | Frey et al. | |
| 5,991,301 A | 11/1999 | Christie | |
| 6,009,100 A | 12/1999 | Gausmann et al. | |
| 6,009,106 A | 12/1999 | Rustad et al. | |
| 6,026,086 A | 2/2000 | Lancelot et al. | |
| 6,031,840 A | 2/2000 | Christie | |
| 6,098,094 A | 8/2000 | Barnhouse et al. | |
| 6,181,703 B1 | 1/2001 | Christie et al. | |
| 6,298,043 B1 | 10/2001 | Mauger et al. | |
| 6,324,179 B1 | 11/2001 | Doshi et al. | |

* cited by examiner

DATA CALLS USING BOTH CONSTANT BIT RATE AND VARIABLE BIT RATE CONNECTIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a system that provides data calls using both constant bit rate and variable bit rate connections.

2. Description of the Prior Art

Telecommunication providers use broadband systems to carry data calls. Data calls are calls that are established to carry primarily data instead of voice. One example of a data call is a call originating from a computer through a modem for web surfing. Data calls can carry voice such as through a data call established for video conferencing.

Figure 1:
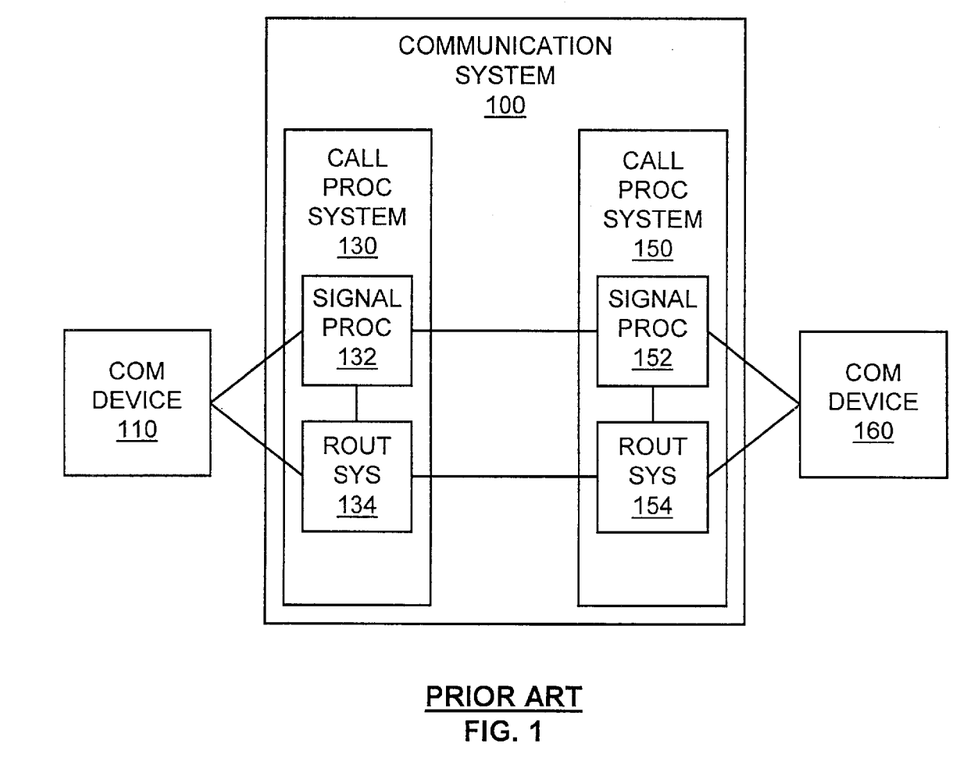
FIG. 1 is a system level block diagram in an example of a prior solution.

The broadband system must efficiently use the bandwidth for all types of calls to improve overall call performance. One prior solution determines the bandwidth on a call by call basis. FIG. 1 depicts a system level block diagram in an example of a prior solution. The prior solution is disclosed in a pending U.S. patent application Ser. No. 09/304,379, entitled "System and Method for Configuring Bandwidth Transmission Rates for Call Connections", filed on May 4, 1999, which is hereby incorporated by reference. In FIG. 1, a communication system 100 comprises a call processing system 130 and a call processing system 150. The call processing system 130 and the call processing system 150 are disclosed in a pending United States Patent Application, entitled "System and Method for Processing a Call", filed on Nov. 5, 1999, which is hereby incorporated by reference. The call processing system 130 comprises a signaling processor 132 and a routing system 134. The call processing system 150 comprises a signaling processor 152 and a routing system 154. A communication device 110 is connected to the signaling processor 132 and the routing system 134. The signaling processor 132 is connected to the routing system 134 and the signaling processor 152. The signaling processor 152 is connected to the routing system 154 and a communication device 160. The communication device 160 is connected to the routing system 154. The routing system 154 is connected to the routing system 134.

Figure 2:
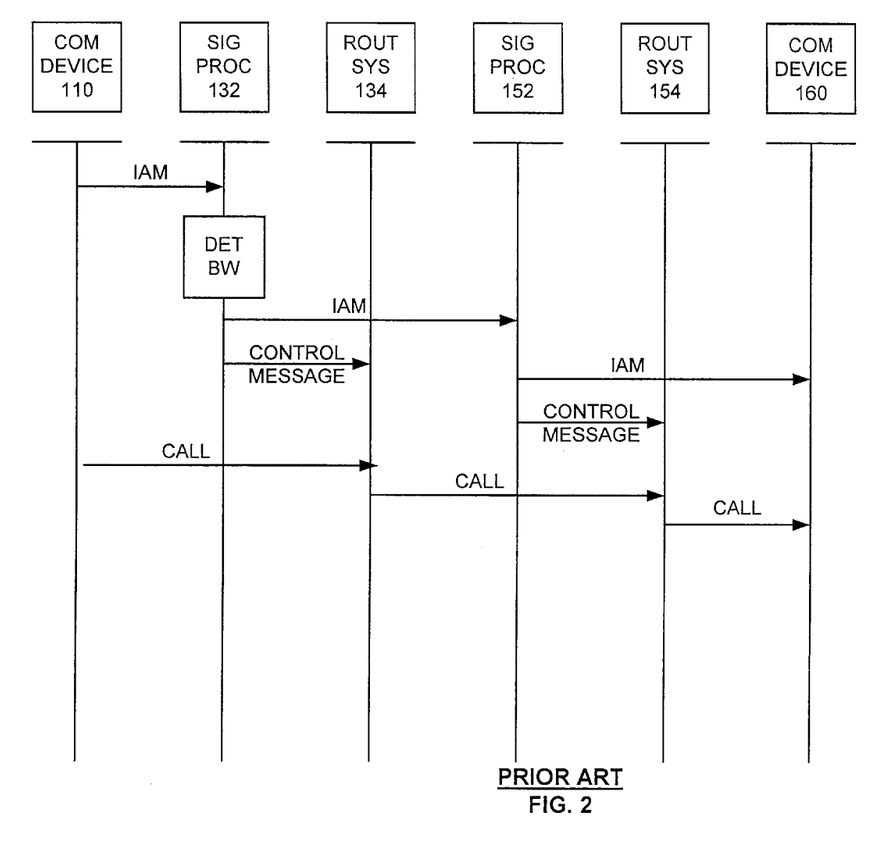
FIG. 2 is a message sequence chart in an example of a prior solution.

FIG. 2 depicts a message sequence chart that depicts the operation of the communication system 100 depicted in FIG. 1. To initiate a data call, the communication device 110 transmits an Initial Address Message (IAM) in Signaling System #7 (SS7) to the signaling processor 132. The signaling processor 132 processes the IAM and determines the bandwidth for the call based on the IAM. The signaling processor 132 transfers the IAM to the signaling processor 152. The signaling processor 132 generates and transmits a first control message identifying the bandwidth for the call to the routing system 134.

The signaling processor 152 processes and transfers the IAM to the communication device 160. The signaling processor 152 generates and transmits a second control message to the routing system 154 based on the IAM. Subsequent SS7 signaling messages for call setup such as address complete messages are not shown for the sake of clarity. The routing system 134 receives the call from the communication device 110. The routing system 134 processes the first control message and routes the call to the routing system 154 based on the first control message. The routing system 154 processes the second control message and routes the call to the communication device 160 based on the second control message.

The data call is made up of N×56K or N×64K connections between the communication device 110 and the routing system 134. The N×56K or N×64K connections are identified by a session identification number. Between the routing system 134 and the routing system 154, the call uses one constant bit rate connection for each N×56K or N×64K connection for the duration of the call.

Typically, the actual bandwidth needed for the data call varies. One problem is the quality of the call is degraded when the actual bandwidth for the data call is greater than the allocated bandwidth. Another problem is unused allocated bandwidth is not utilized when the actual bandwidth is less than the allocated bandwidth. If the data call is not utilizing the unused allocated bandwidth, then this bandwidth could be utilized by other calls.

Variable bit rate connections have been used for calls between asynchronous transfer mode (ATM) switches. The call uses only as much bandwidth as needed with the remaining bandwidth being allocated to other telecommunication services. Unfortunately, call processing systems do not effectively use both constant bit rate and variable bit rate connections for data calls.

SUMMARY OF THE INVENTION

The invention solves the above problems by setting up a constant bit rate and variable bit rate connections as needed for a data call. The invention advantageously uses a constant bit rate connection and a variable bit rate connection to utilize the bandwidth for a data call. Any bandwidth that the data call does not need and use can be utilized for other calls. Thus, the performance of the other calls is improved. Also, the use of a variable bit rate connection ensures handling of the data call when more bandwidth is needed.

A first call processing system receives signaling for the data call. The first call processing system processes the signaling to generate a first instruction to set up a constant bit rate connection for the data call between the first call processing system and a second call processing system. The first call processing system processes the signaling to generate a second instruction to set up a variable bit rate connection between the first call processing system and the second call processing system.

In one embodiment of the invention, the first call processing system generates a third instruction to alter the variable bit rate connection between the first call processing system and the second call processing system based on the capacity needed for the data call. Also, in other embodiments, the first call processing system determines the minimum rate for the constant bit rate connection or the burst characteristics of the data call for the variable bit rate connections.

DETAILED DESCRIPTION OF THE INVENTION

First Call Processing System and Second Call Processing System

Figure 3:
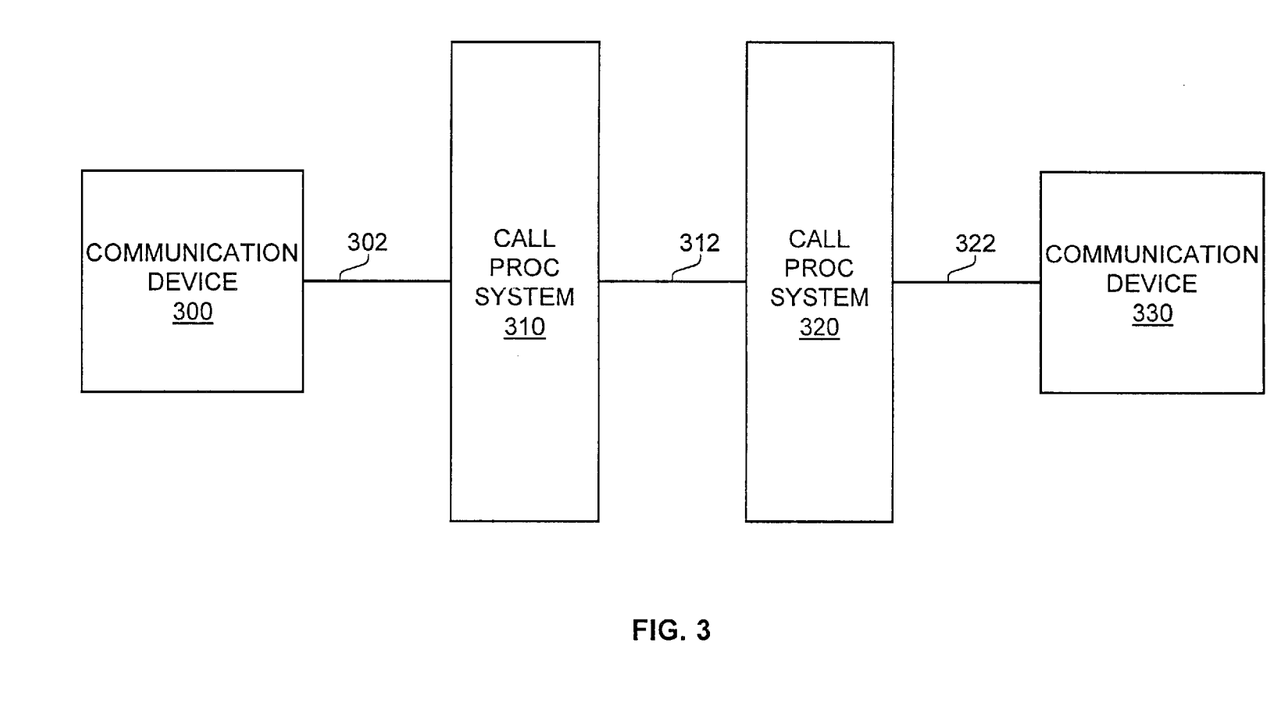
FIG. 3 is a system level block diagram in an example of the invention.

FIG. 3 depicts a system level block diagram in an example of the invention. A communication device 300 is connected to a first call processing system 310 by a first call link 302. The first call processing system 310 is connected to a second call processing system 320 by a second call link 312. The second call processing system 320 is connected to a communication device 330 by a third call link 322.

The communication device 300 and the communication device 330 could be any device configured to exchange calls. Some examples of the communication device 300 and the communication device 330 are customer premises equipment (CPE), a service platform, a switch, and a remote digital terminal. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303.

The first call processing system 310 could be any system that is configured to (1) receive signaling for the data call, (2) process the signaling to generate a first instruction to set up a constant bit rate connection for the data call between the first call processing system 310 and the second call processing system 320, and (3) process the signaling to generate a second instruction to set up a variable bit rate connection between the first call processing system 310 and the second call processing system 320. One example of the signaling for the call is an Initial Address Message (IAM). The IAM could be in Signaling System #7 (SS7) or C7.

The second call processing system 320 could be any system that is configured to exchange calls with the first call processing system 310 through a constant bit rate connection and variable bit rate connections and exchange calls with the communication device 330.

In operation, the communication device 300 transmits signaling for a data call to the first call processing system 310 to initiate the data call. The first call processing system 310 receives the signaling for the data call. The first call processing system 310 then processes the signaling to generates a first instruction to set up a constant bit rate connection for the data call between the first call processing system 310 and the second call processing system 320. The first call processing system 310 then processes the signaling to generate a second instruction to set up a variable bit rate connection between the first call processing system 310 and the second call processing system 320. The first call processing system 310 then extends the signaling for the data call to the second call processing system 320. The second call processing system 320 then extends the signaling for the data call to the communication device 330. The communication device 300 transfers data to the first call processing system 310. The first call processing system 310 transfers data to the second call processing system 320 via the constant bit rate connection and the variable bit rate connection. The second call processing system 320 then transfers the data to the communication device 330. If desired, the first instruction and second instruction could be combined into one instruction.

Call Processing Systems with Signaling Processors and Routing Systems

Figure 4:
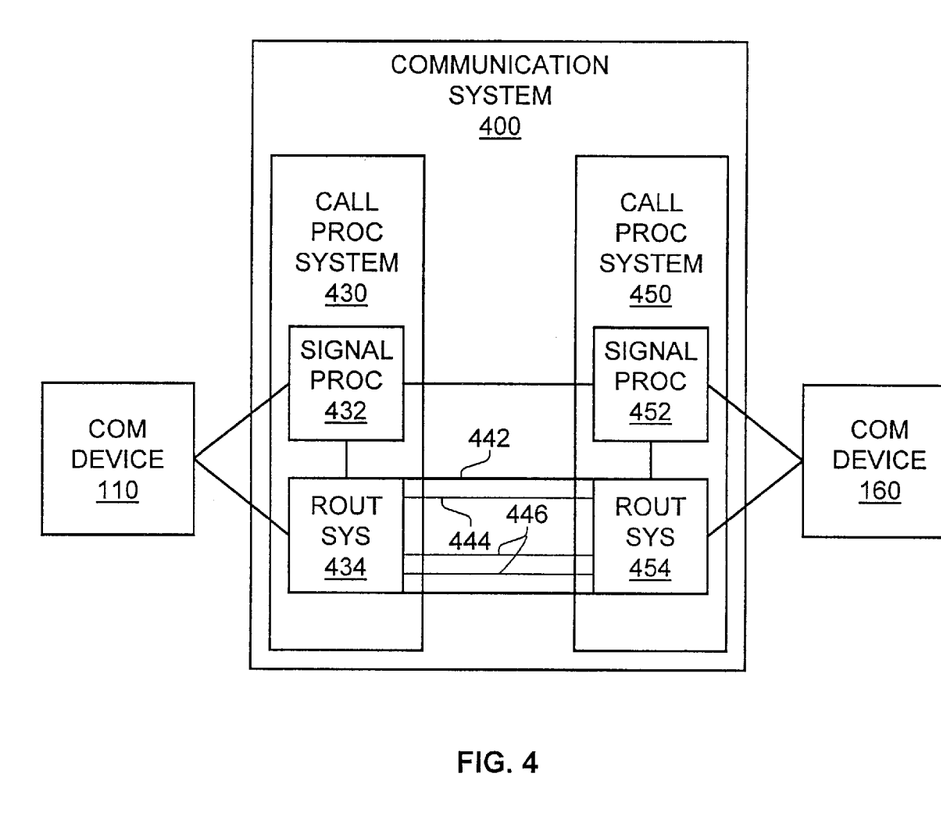
FIG. 4 is a system level block diagram of a communication system in an example of the invention.
Figure 5:
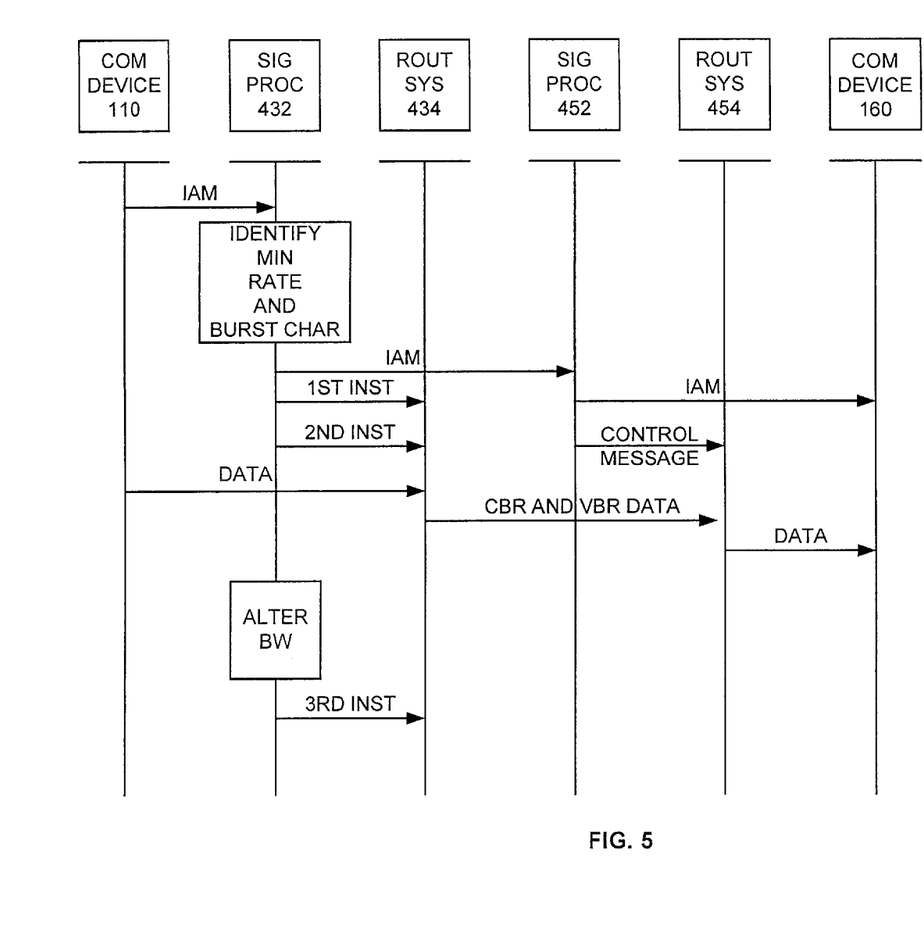
FIG. 5 is a message sequence chart for the operation of a communication system in an example of the invention.

FIGS. 4–5 disclose one embodiment of the invention, but the invention is not restricted to the configuration provided below. Those skilled in the art will appreciate numerous variations in a communication system configuration and operation that are within the scope of the invention. Those skilled in the art will also appreciate how the principles illustrated in this example can be used in other examples of the invention. A particular reference number in one figure refers to the same element in all of the other figures.

FIG. 4 depicts a system level block diagram of a communication system 400 in an example of the invention. The communication system 400 comprises a call processing system 430 and a call processing system 450. The call processing system 430 comprises a signaling processor 432 and a routing system 434. The call processing system 450 comprises a signaling processor 452 and a routing system 454. A communication device 110 is connected to the signaling processor 432 and the routing system 434. The signaling processor 432 is connected to the routing system 434 and the signaling processor 452. The signaling processor 452 is connected to the routing system 454 and a communication device 160. The communication device 160 is connected to the routing system 454. The routing system 454 is connected to the routing system 434 via a call link 442. The call link 442 is comprised of a constant bit rate connection 444 and variable bit rate connections 446.

FIG. 5 depicts a message sequence chart for the operation of the communication system 400 in an example of the invention. To initiate the call, the communication device 110 transmits an Initial Address Message (IAM) in Signaling System #7 (SS7) to the signaling processor 432. The signaling processor 432 processes the IAM and identifies the call as a data call based on the information in the IAM. Because the call is a data call, the signaling processor 432 identifies the minimum rate based on the information in the IAM. In one embodiment of the invention, the minimum rate is based on the Bearer Capacity parameter of the IAM. The minimum rate is the lowest acceptable rate of data transfer for the data call. The signaling processor 432 determines the burst characteristics of the data call from the information in the IAM. The burst characteristics are the information associated with the maximum rate that the data call can achieve. The signaling processor 432 transfers the IAM to the signaling processor 452. Based on the processing of the IAM, the signaling processor 432 then generates and transfers a first instruction to the routing system 434 to set up a constant bit rate connection 444 between the routing system 434 and the routing system 454 via the call link 442. The first instruction indicates the minimum rate for the data call. Based on the processing of the IAM, the signaling processor 432 generates and transfers a second instruction to the routing system 434 to set up a variable bit rate connection 446 between the routing system 434 and the routing system 454 via the call link 442 based on the processing of the IAM.

The signaling processor 452 processes and transfers the IAM to the communication device 160. The signaling processor 452 then generates and transfers a control message to the routing system 454 to route the data call to the communication device 160 based on the processing of the IAM.

Subsequent SS7 signaling messages related to call setup such as address complete messages are not shown for the sake of clarity.

The routing system 434 then receives the data call from the communication device 110. The data call between the communication device 110 and the routing system 434 could be made up of N×56K or N×64K connections identified by a session identification number. The routing system 434 processes the first instruction and sets up a constant bit rate connection 444 with the routing system 454 via the call link 442 based on the first instruction. The routing system 434 also routes the data call to the routing system 154 based on the first instruction. The routing system 434 processes the second instruction and sets up the variable bit rate connection 446 with the routing system 454 via the call link 442 based on the second instruction. The second instruction indicates the burst characteristics of the data call. The routing system 454 processes the control message and routes the call to the communication device 160 based on the control message.

During the data call, the available bandwidth could be increased or decreased within the variable bit rate connections 446. The signaling processor 432 generates a third instruction to the routing system 434 to alter the variable rate connections 446 based on the capacity needed for the data call. Thus, the bandwidth for the data call can be optimized so performance of other calls could improve with increased bandwidth.

The above-described processor logic can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of processing a data call, the method comprising:

receiving signaling for the data call into a first call processing system;

processing the signaling to generate a first instruction to set up a constant bit rate connection for the data call between the first call processing system and a second call processing system; and processing the signaling to generate a second instruction to set up a variable bit rate connection between the first call processing system and the second call processing system.

2. The method of claim 1 further comprising generating a third instruction to alter the variable bit rate connection between the first call processing system and the second call processing system during the call.

3. The method of claim 1 wherein the signaling is Signaling System #7.

4. The method of claim 1 wherein the signaling is C7.

5. The method of claim 1 wherein the signaling comprises an Initial Address Message.

6. The method of claim 5 wherein processing the signaling comprises processing the Bearer Capacity parameter of the Initial Address Message.

7. The method of claim 1 further comprising determining a minimum rate for the data call and wherein the first instruction indicates the minimum rate.

8. The method of claim 1 further comprising determining burst characteristics for the data call and wherein the second instruction indicates the burst characteristics.

9. The method of claim 1 further comprising processing the signaling to generate and transfer an Initial Address Message to the second call processing system.

10. A software product for processing a data call comprising:

communication software operational when executed by a processor to direct the processor to receive signaling for the data call into a first call processing system, process the signaling to generate a first instruction to set up a constant bit rate connection for the data call between the first call processing system and a second call processing system, and process the signaling to generate a second instruction to set up a variable bit rate connection between the first call processing system and the second call processing system; and a software storage medium operational to store the communication software.

11. The software product of claim 10 wherein the communication software is operational when executed by the processor to direct the processor to generate a third instruction to alter the variable bit rate connection between the first call processing system and the second call processing system during the call.

12. The software product of claim 10 wherein the signaling is Signaling System #7.

13. The software product of claim 10 wherein the signaling is C7.

14. The software product of claim 10 wherein the signaling comprises an Initial Address Message.

15. The software product of claim 14 wherein the communication software is further operational when executed by the processor to direct the processor to process the Bearer Capacity parameter of the Initial Address Message.

16. The software product of claim 10 wherein the communication software is operational when executed by the processor to direct the processor to determine a minimum rate for the data call and wherein the first instruction indicates the minimum rate.

17. The software product of claim 10 wherein the communication software is operational when executed by the processor to direct the processor to determine burst characteristics for the data call and wherein the second instruction indicates the burst characteristics.

18. The software product of claim 10 wherein the communication software operational when executed by the processor to direct the processor to process the signaling to generate and transfer an Initial Address Message to the second call processing system.

19. A call processing system for processing a data call, the call processing system comprising:

a signaling processor configured to receive signaling for the data call, process the signaling to generate a first instruction to set up a constant bit rate connection for the data call between a first routing system and a second routing system, and process the signaling to generate a second instruction to set up a variable bit rate connection between the first routing system and the second routing system; and the first routing system configured to receive and process the first instruction to set up the constant bit rate connection for the data call with the second routing system, receive and process the second instruction to set up the variable bit rate connection with the second routing system, and receive and transfer data through the constant bit rate connection and the variable bit rate connection to the second routing system.

20. The call processing system of claim 19 wherein:

the signaling processor is configured to generate a third instruction to alter the variable bit rate connection between the first routing system and the second routing system based on the capacity needed for the data call; and the first routing system is configured to receive and process the third instruction to alter the variable bit rate connection.

21. The call processing system of claim 19 wherein the signaling is Signaling System #7.

22. The call processing system of claim 19 wherein the signaling is C7.

23. The call processing system of claim 19 wherein the signaling comprises an Initial Address Message.

24. The call processing system of claim 23 wherein the signaling processor configured to process the Bearer Capacity parameter of the Initial Address Message.

25. The call processing system of claim 19 wherein the signaling processor is configured to determine a minimum rate for the data call and wherein the first instruction indicates the minimum rate.

26. The call processing system of claim 19 wherein the signaling processor is configured to determine burst characteristics for the data call and wherein the second instruction indicates the burst characteristics.

27. The call processing system of claim 19 wherein the signaling processor is configured to process the signaling to generate and transfer an Initial Address Message to the second call processing system.

28. A communication system for processing a data call, the communication system comprising:

a first call processing system configured to receive signaling for the data call, process the signaling to generate a first instruction to set up a constant bit rate connection for the data call between the first call processing system and a second call processing system, generate a second instruction to set up a variable bit rate connection between the first call processing system and the second call processing system to handle peak bursts of the data call based on the processing of the signaling, and transfer data to the second call processing system through the constant bit rate connection and the variable bit rate connection; and the second call processing system configured to exchange data through the constant bit rate connection and the variable bit rate connection with the first call processing system.

29. The communication system of claim 28 wherein the first call processing system is configured to generate a third instruction to alter the variable bit rate connection between the first call processing system and the second call processing system during the call.

30. The communication system of claim 28 wherein the signaling is Signaling System #7.

31. The communication system of claim 28 wherein the signaling is C7.

32. The communication system of claim 28 wherein the signaling comprises an Initial Address Message.

33. The communication system of claim 28 wherein the first call processing system is configured to process the Bearer Capacity parameter of the Initial Address Message.

34. The communication system of claim 28 wherein the first call processing system is configured to determine a minimum rate for the data call and wherein the first instruction indicates the minimum rate.

35. The communication system of claim 28 wherein the first call processing system is configured to determine burst characteristics for the data call and wherein the second instruction indicates the burst characteristics.

36. The communication system of claim 28 wherein:

the first call processing system is configured to process the signaling to generate and transfer an Initial Address Message to the second call processing system; and the second call processing system is configured to receive the Initial Address Message.

* * * * *